United States Patent
Rock et al.

(10) Patent No.: US 9,005,847 B2
(45) Date of Patent: Apr. 14, 2015

(54) FUEL CELL FABRICATION USING PHOTOPOLYMER BASED PROCESSES

(75) Inventors: Jeffrey A. Rock, Fairport, NY (US); Yeh-Hung Lai, Webster, NY (US); Keith E. Newman, Athens, PA (US); Gerald W. Fly, Geneseo, NY (US); Ping Liu, Irvine, CA (US); Alan J. Jacobsen, Woodland Hills, CA (US); William B. Carter, Calabasas, CA (US); Peter D. Brewer, Westlake Village, CA (US)

(73) Assignees: GM Global Technology Operations LLC, Detroit, MI (US); HRL Laboratories, LLC, Malibu, CA (US)

( * ) Notice: Subject to any disclaimer, the term of this patent is extended or adjusted under 35 U.S.C. 154(b) by 901 days.

(21) Appl. No.: 13/151,734

(22) Filed: Jun. 2, 2011

(65) Prior Publication Data
US 2011/0229823 A1 Sep. 22, 2011

Related U.S. Application Data

(63) Continuation-in-part of application No. 12/341,062, filed on Dec. 22, 2008, now Pat. No. 8,268,510.

(51) Int. Cl.
*H01M 8/00* (2006.01)
*H01M 2/08* (2006.01)
*H01M 2/14* (2006.01)
(Continued)

(52) U.S. Cl.
CPC .......... *H01M 8/0232* (2013.01); *H01M 8/0236* (2013.01); *H01M 8/0239* (2013.01); *H01M 8/0245* (2013.01); *H01M 8/0258* (2013.01); *H01M 8/0267* (2013.01); *H01M 2008/1095* (2013.01); *Y02E 60/50* (2013.01)

(58) Field of Classification Search
USPC .......................... 429/535; 427/115, 508, 535
See application file for complete search history.

(56) References Cited

U.S. PATENT DOCUMENTS 5,290,642 A * 3/1994 Minh et al. .................... 429/535
6,274,288 B1 8/2001 Kewitsch et al.
(Continued)

FOREIGN PATENT DOCUMENTS

CN 101814614 A 8/2010

OTHER PUBLICATIONS

Acta Materialia 55 (2007) 6724-6733, Compression behavior of micro-scale truss structures formed from self-propagating polymer waveguides; Alan J. Jacobsen, William Barvosa-Carter, Steven Nutt. 2007 Acta Materialia Inc. Published by Elsevier Ltd.: actamat.2007.08.036.
(Continued)

*Primary Examiner* — Patrick Ryan
*Assistant Examiner* — Julian Anthony
(74) *Attorney, Agent, or Firm* — Fraser Clemens Martin & Miller LLC; James D. Miller (57) ABSTRACT

A method for fabricating a fuel cell component includes the steps of providing a mask having a plurality of radiation transparent apertures, a radiation-sensitive material having a sensitivity to the plurality of radiation beams, and a flow field layer. The radiation-sensitive material is disposed on the flow field layer. The radiation-sensitive material is then exposed to the plurality of radiation beams through the radiation transparent apertures in the mask to form a diffusion medium layer with a micro-truss structure.

19 Claims, 6 Drawing Sheets

(51) Int. Cl.
  *B05D 5/12*  (2006.01)
  *H01M 8/02*  (2006.01)
  *H01M 8/10*  (2006.01)

(56) References Cited

U.S. PATENT DOCUMENTS 6,861,205 B2 * 3/2005 Bowman et al. .............. 430/312
7,382,959 B1   6/2008 Jacobsen
8,268,510 B2 * 9/2012 Rock et al. .................... 429/535

OTHER PUBLICATIONS

Microstereolithography: Concepts and applications; Arnaud Bertsch, Paul Bernhard, Philippe Renaud; (c) 2001 IEEE.

Microstereolithography: a Review; Arnard Bertsch, Sebastien Jiguet, Paul Bernhard, Philippe Renaud; Swiss Federal Institute of Technology,(c) 2003 Material Research Society.

Characterisation of Epoxy Resins for Microstereolithographic Rapid Prototyping; C.R. Chatwin, M. Farsari, S. Huang, M.I. Heywood, R.C.D. Young, P.M. Birch, F. Claret-Tournier and J.D. Richardson, School of Engineering, University of Sussex, Falmer, Brighton, UK; (c) 1999 Springer-Verlag London Limited.

Two-Photon Photopolymerization and 3D Lithographic Microfabrication; Hong-Bo Sun, Satoshi Kawata; Depart of Applied Physics, Osaka University, Japan; APS (2004) (c) Springer-Verlag 2004.

Fabrication and moulding of cellular materials by rapid prototyping; J. Stampfl, H. Houad and S. Seidler; Institute of Material Science and Testing, Vienna University of Technology, Austria; R Liska and F. Schwager;.Institute of Applied Synthetic Chemistry, Vienna University of Technology, Austria; A Woesz and P Fratzl; Max Planck Institute of Colloids and Interfaces, German; Int. J. Materials and Product Technology, vol. 21, No. 4, 2004, (c) Inderscience Enterprises Ltd.

* cited by examiner

FUEL CELL FABRICATION USING PHOTOPOLYMER BASED PROCESSES

CROSS-REFERENCE TO RELATED APPLICATIONS

This application is a continuation-in-part of U.S. patent application Ser. No. 12/341,062 filed on Dec. 22, 2008. The entire disclosure of the above application is hereby incorporated herein by reference.

FIELD OF THE INVENTION

The present disclosure relates to a fuel cell and more particularly to fuel cell components manufactured by photopolymerization.

BACKGROUND OF THE INVENTION

A fuel cell has been proposed as a clean, efficient and environmentally responsible power source for electric vehicles and various other applications. Individual fuel cells can be stacked together in series to form a fuel cell stack for various applications. The fuel cell stack is capable of supplying a quantity of electricity sufficient to power a vehicle. In particular, the fuel cell stack has been identified as a potential alternative for the traditional internal-combustion engine used in modern automobiles.

One type of fuel cell is the polymer electrolyte membrane (PEM) fuel cell. The PEM fuel cell includes three basic components: an electrolyte membrane; and a pair of electrodes, including a cathode and an anode. The electrolyte membrane is sandwiched between the electrodes to form a membrane-electrode-assembly (MEA). The MEA is typically disposed between porous diffusion media (DM), such as carbon fiber paper, which facilitates a delivery of reactants, such as hydrogen to the anode and oxygen to the cathode. In the electrochemical fuel cell reaction, the hydrogen is catalytically oxidized in the anode to generate free protons and electrons. The protons pass through the electrolyte to the cathode. The electrons from the anode cannot pass through the electrolyte membrane, and are instead directed as an electric current to the cathode through an electrical load, such as an electric motor. The protons react with the oxygen and the electrons in the cathode to generate water.

It is also known to use other reactants in the PEM fuel cell such as methanol, for example. Methanol may be catalytically oxidized to form carbon dioxide. Protons from the methanol oxidation are transported across the electrolyte membrane to the cathode where they react with oxygen, typically from air, to generate water. As with the hydrogen PEM fuel cell, electrons are transported as an electric current through the external load, such as the electric motor, from the anode to the cathode.

The electrolyte membrane is typically formed from a layer of ionomer. A typical ionomer is a perfluorosulfonic acid (PFSA) polymer, such as Nafion@, commercially available from the E. I. du Pont de Nemours and Company. The electrodes of the fuel cell are generally formed from a finely divided catalyst. The catalyst may be any electro-catalyst which catalytically supports at least one of an oxidation of hydrogen or methanol and a reduction of oxygen for the fuel cell electrochemical reaction. The catalyst is typically a precious metal such as platinum or another platinum-group metal. The catalyst is generally disposed on a carbon support, such as carbon black particles, and is dispersed in an ionomer.

The electrolyte membrane, electrodes, and DM are disposed between a pair of fuel cell plates and sealed, for example, with a gasket providing a substantially fluid-tight seal. The fuel cell plate may have a plurality of channels formed therein for distribution of the reactants and coolant to the fuel cell. The fuel cell plate is typically formed by a conventional process for shaping sheet metal such as stamping, machining, molding, or photo etching through a photolithographic mask, for example. In the case of a bipolar fuel cell plate, the fuel cell plate is typically formed from a pair of unipolar plates which are then joined. It is also known to form the fuel cell plate from a composite material, such as a graphite composite or graphite-filled polymer. Undesirably, the known methods for forming each of the electrolyte membrane, the electrodes, the diffusion media, and the fuel cell plates can be costly and time consuming.

It is also known to manufacture fuel cell components, including the fuel cell plates, according to conventional polymer foaming processes, such as with reticulated foam materials. However, conventional foaming processes yield non-uniform and random (not ordered) three dimensional microstructures. Certain techniques do exist to create polymer materials with ordered three dimensional microstructures, such as stereolithography techniques; however, these techniques typically rely on a bottom-up, layer-by-layer approach which prohibits production volume scalability.

Materials having ordered three dimensional microstructures are described by Jacobsen et al. in "Compression behavior of micro-scale truss structures formed from self-propagating polymer waveguides", Acta Materialia 55, (2007) 6724-6733, the entire disclosure of which is hereby incorporated herein by reference. One method and system of creating polymer materials with ordered micro-truss structures is disclosed by Jacobsen in U.S. Pat. No. 7,382,959, the entire disclosure of which is hereby incorporated herein by reference. The system includes at least one collimated light source selected to produce a collimated light beam; a reservoir having a photo-monomer adapted to polymerize by the collimated light beam; and a mask having at least one aperture and positioned between the at least one collimated light source and the reservoir. The at least one aperture is adapted to guide a portion of the collimated light beam into the photo-monomer to form the at least one polymer waveguide through a portion of a volume of the photo-monomer. Micro-truss materials produced by the method and system are further disclosed by Jacobsen in U.S. patent application Ser. No. 11/801,908, the entire disclosure of which is hereby incorporated herein by reference. A polymer material that is exposed to radiation and results in a self-focusing or self-trapping of light by formation of polymer waveguides is also described by Kewitsch et al. in U.S. Pat. No. 6,274,288, the entire disclosure of which is hereby incorporated herein by reference.

There is a continuing need for a structure and method of manufacturing fuel cell components that optimizes fuel cell durability, minimizes tooling costs, minimizes production costs, and minimizes development time. Desirably, the method militates against the non-uniformity and design constraints associated with the formation of components according to the known methods.

SUMMARY OF THE INVENTION

In concordance with the instant disclosure, a structure and method for fabricating fuel cell components that optimizes fuel cell durability, minimizes tooling costs, minimizes production costs, minimizes development time, and militates against the non-uniformity and design constraints associated with the formation of components according to the known methods, is surprisingly discovered.

In a first embodiment, a fuel cell component includes a substrate and at least one flow field layer. The flow field layer has at least one of a plurality of radiation-cured reactant flow channels and a plurality of radiation-cured coolant channels. The flow field layer may be one of disposed between the substrate and a diffusion medium layer, and disposed on a diffusion medium layer opposite the substrate.

In a further embodiment, a method for fabricating a repeating unit for a fuel cell includes the steps of: providing a first fuel cell component having a first substrate, a first diffusion medium layer with a micro-truss structure, and a flow field layer with a plurality of reactant flow channels, the flow field layer disposed between the first substrate and the first diffusion medium layer; providing a second fuel cell component having a second diffusion medium layer with a micro-truss structure and a second flow field layer with a plurality of reactant flow channels and a plurality of coolant channels, the second diffusion medium layer disposed between the second substrate and the second flow field layer; disposing the first fuel cell component onto the second fuel cell component, wherein the first substrate is disposed adjacent the second flow field layer; removing the second substrate from the second fuel cell component; disposing a first microporous layer onto the first diffusion layer and a second microporous layer onto the second diffusion layer; and one of applying a first electrode to the first microporous layer and a second electrode to the second microporous layer, and disposing a polymer electrolyte membrane on the first electrode; and disposing a membrane electrode assembly on one of the first and second microporous layers, thereby completing the repeating unit for the fuel cell.

In another embodiment, a method for fabricating a repeating unit for a fuel cell includes the steps of: providing a first substrate; applying a radiation-sensitive material to the first substrate; placing a first mask between at least one radiation source and the radiation-sensitive material, the mask extending along a single plane and having a plurality of apertures; exposing the radiation-sensitive material to a plurality of radiation beams to form a plurality of negative removable cores; removing the first mask from the negative removable cores; applying a second radiation-sensitive material to the negative removable cores; removing an uncured volume of the radiation-sensitive material; coating the first substrate and the negative removable cores with an electrically conductive coating; applying a third radiation-sensitive material to the first substrate; placing a second mask between the at least one radiation source and the second radiation-sensitive material; exposing the second radiation-sensitive material to a plurality of radiation beams to form a first diffusion medium layer having a micro-truss structure; placing a third mask between the at least one radiation source and the third radiation-sensitive material; exposing the third radiation-sensitive material to a plurality of radiation beams to form a second diffusion medium layer having a micro-truss structure; removing the negative removable cores and the uncured second and third radiation-sensitive; coating the first and second diffusion medium layers with an electrically conductive coating; and applying a membrane electrode assembly to one of the first and second diffusion medium layers, thereby completing the repeating unit for the fuel cell.

The present disclosure further details a multi-tiered composite of open-cellular truss structures to be used as the diffusion media and the flow field in a polymer electrolyte membrane fuel cell. The flow field and diffusion media direct the flow of gases on the anode side and cathode side of the fuel cell (generally reactant gases of hydrogen and oxygen) towards a membrane electrolyte assembly. The disclosed fabrication method allows for the flow field and diffusion media open-cellular truss structures to be fully integrated, regardless of the differences in size and material. The disclosed method enables the fabrication of highly complex three-dimensional architected structures. A purpose of the method is to achieve the required dimensions for an integrated, functional flow field and diffusion media layer. The flow field can require a thickness exceeding 200 μm, for example. The resolution required for features and the diffusion media can be less than 10 μm, for example. These feature sizes are readily achieved with the present method.

Advantageously, the disclosed fabrication method permits low temperature processing to minimize thermal strains developed from a coefficient of thermal expansion (CTE) mismatch between different radiation-cured layers. A bonding mechanism allows for one of the radiation-cured layers to be formed in-situ onto an other of the radiation-cured layers, rather than forming the two radiation-cured layers independently before they are bonded together. The in-situ process eliminates the need for critical alignment between the different radiation-cured layers. A multi-functional and reusable handle wafer can also serve as a photomask used to pattern the one of the radiation-cured layers.

Furthermore, with respect to multi-tiered composite structures, an interlocking mechanism between the different radiation-cured layers absorbs thermal strain and provides a strong bond between the radiation-cured layers. The dimensions (member radius, spacing, thickness, density) of the radiation-cured layers can also be adjusted to optimal fuel cell performance.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention.

The description and drawings serve to enable one skilled in the art to make and use the invention, and are not intended to limit the scope of the invention in any manner. In respect of the methods disclosed, the steps presented are exemplary in nature, and thus, are not necessary or critical.

Figure 1:
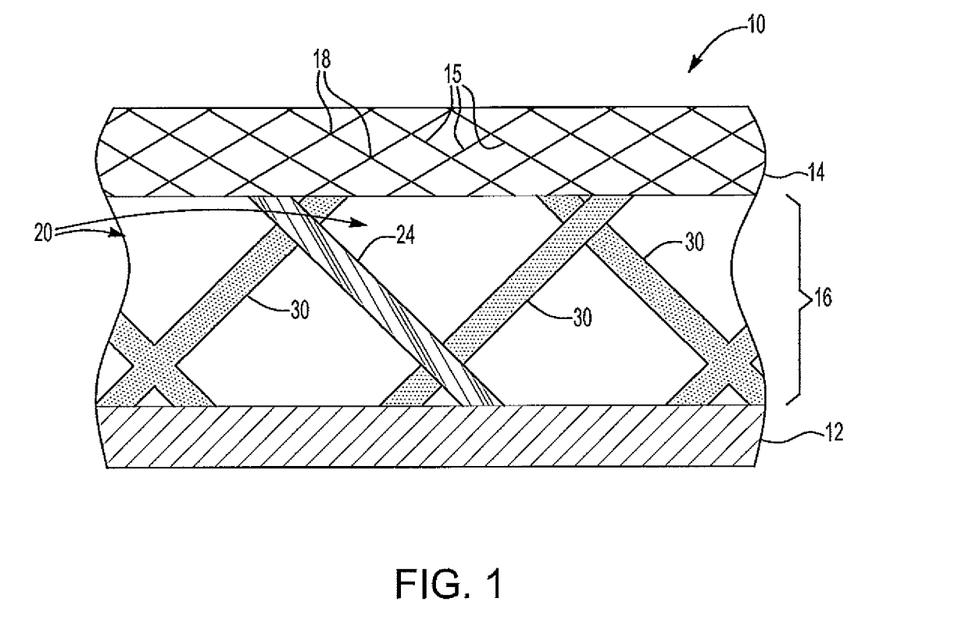
FIG. 1 is a fragmentary side cross-sectional view of a fuel cell component according to one embodiment of the present disclosure.
Figure 2:
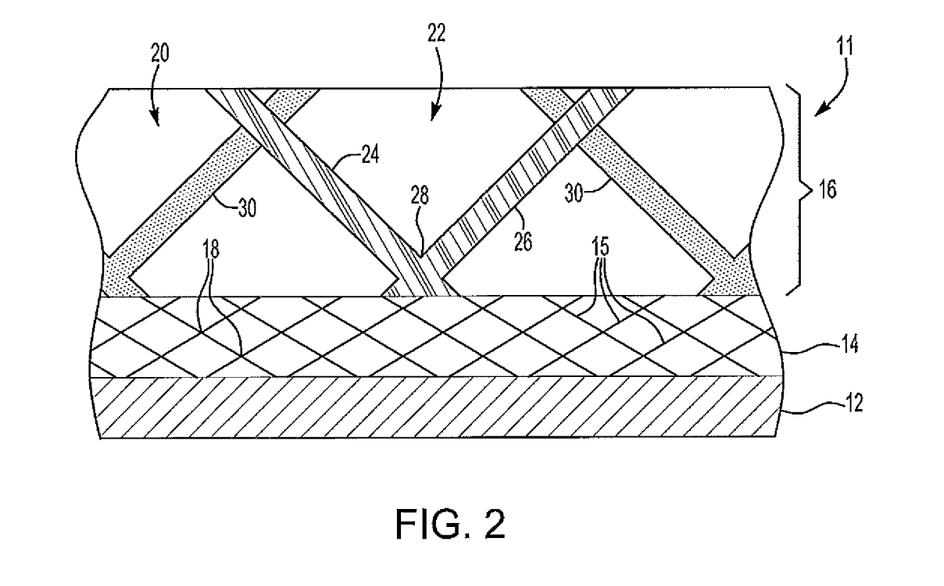
FIG. 2 is a fragmentary side cross-sectional view of a fuel cell component according to another embodiment of the present disclosure.

As shown in FIGS. 1 and 2, a photopolymer based process to fabricate one of a first fuel cell component 10 and a second fuel cell component 11 is provided. The fuel cell components 10, 11 include a substrate 12, at least one diffusion medium layer 14 having a micro-truss structure 15, and at least one flow field layer 16. In FIG. 1, the first fuel cell component 10 is shown with the flow field layer 16 disposed between the substrate 12 and the diffusion medium layer 14. In FIG. 2, the second fuel cell component 11 is shown with the diffusion medium layer 14 disposed between the substrate 12 and the flow field layer 16. The substrate 12 may be removable or permanently attached to one of the diffusion medium layer 14 and the flow field layer 16, as desired.

At least one of the diffusion medium layer 14 and the flow field layer 16 are formed from a radiation-sensitive material. The formation of radiation-cured structures such as the diffusion medium layer 14 and the flow field layer 16 from the radiation-sensitive material are described, for example, in Assignee's co-pending U.S. patent application Ser. No. 12/339,308, the entire disclosure of which is hereby incorporated herein by reference.

The substrate 12 may be formed from any material that permits the formation of polymeric structures thereon. The substrate 12 may be electrically nonconductive or electrically conductive, as desired. For example, the substrate 12 may be electrically nonconductive if it is intended to remove the substrate 12 after the formation of one of the diffusion medium layer 14 and the flow field layer 16. If it is intended that the substrate 12 remain within the fuel cell, however, the substrate 12 may be electrically conductive. In one example, the substrate 12 is formed from a metal or an electrically conductive composite material that does not significantly degrade under typical photopolymerization conditions, for example. The substrate 12 may alternatively be formed from an electrically nonconductive material having holes or vias formed therein in which an electrically conductive material may be disposed, for example, by plating to cause the substrate 12 to become electrically conductive. In a particular example, the substrate 12 is formed from stainless steel strips. The stainless steel strips may be provided as one of coiled steel strips, rack loaded steel strips, or individual blanks, for example. In certain embodiments the substrate 12 is a substantially planar stainless steel strip. The substrate 12 may also be provided with a texture or a pattern formed therein, as desired.

The substrate 12 may further be provided with a coating or surface treatment for bonding and debonding from one of the diffusion medium layer 14 and the flow field layer 16. As a nonlimiting example, the substrate 12 may have a coating adapted to bond with an uncured polymer material during the manufacture of the fuel cell component 10, 11. The surface treatment may further facilitate a debonding of a cured polymer from the substrate 12. In particular, a backside of the substrate 12 that is typically disposed on a flat surface during manufacture of the fuel cell component 10, 11 may have a coating to militate against an undesired contamination or plating of the substrate 12. A skilled artisan may select suitable surface treatments, including coatings, as desired.

Figure 4:
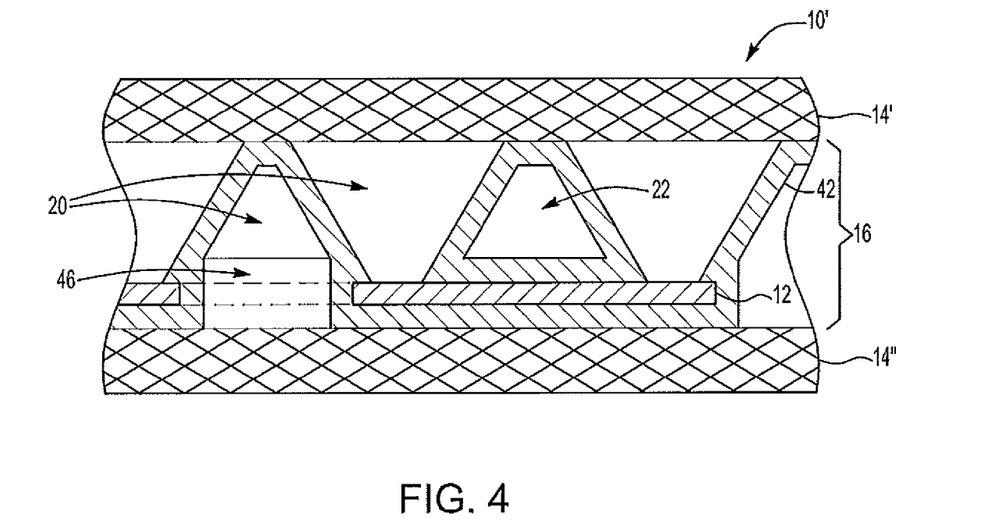
FIG. 4 is a fragmentary side cross-sectional view of a fuel cell component according to a further embodiment of the present disclosure.
Figure 5:
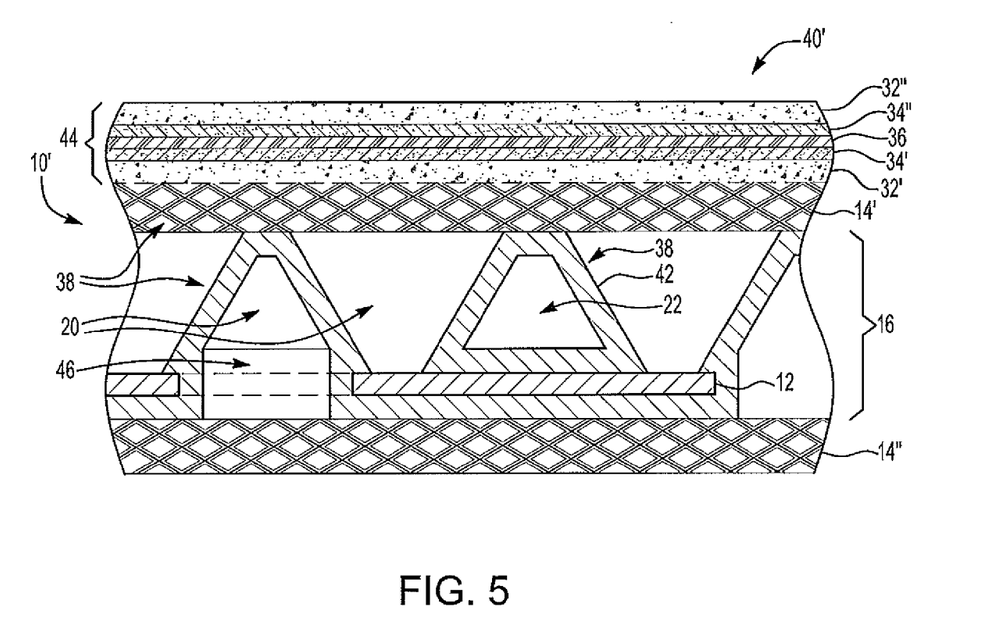
FIG. 5 is a fragmentary side cross-sectional view of a repeating fuel cell unit manufactured with the fuel cell component shown in FIG. 4.

In a further embodiment, the substrate 12 may have through holes (not shown) formed therein. The through holes may facilitate a draining of liquid photomonomers and solvents, or a removal of solid radiation-sensitive polymers, employed during manufacture of the fuel cell components 10, 11. The through holes may also provide typical end product features such as ports and header openings, for example, as described in Applicant's copending U.S. application Ser. No. 11/762,845, the entire disclosure of which is hereby incorporated herein by reference. In other embodiments, the through holes may cooperate with the flow field layer 16 (such as shown in FIGS. 4 and 5). The through holes may be formed by mechanical perforation or by laser cutting, for example, prior to application of one of the diffusion medium layer 14 and the flow field layer 16 to the substrate 12. Other suitable means for forming the through holes may also be employed.

The diffusion medium layer 14 according to the present disclosure has the micro-truss structure 15. The micro-truss structure 15 includes a plurality of first truss elements that extend along a first direction, a plurality of second truss elements that extend along a second direction, and a plurality of third truss elements that extend along a third direction. The first, second, and third truss elements may interpenetrate each other at a plurality of nodes 18. It should be appreciated that the first, second, and third truss elements may not interpenetrate each other, or may interpenetrate each other at the plurality of nodes 18 on an intermittent basis, as desired. The first, second, and third truss elements form a continuous, three dimensional self supporting cellular structure.

Although the micro-truss structure 15 with the plurality of first truss elements, the plurality of second truss elements, and the plurality of third truss elements may have a 4-fold architectural symmetry as described hereinabove, a skilled artisan should appreciate that other architectures, such a 3-fold symmetry and 6-fold symmetry, may be employed within the scope of the present disclosure. The particular architecture may be selected, for example, to increase the micro-truss structure 15 connectivity and reduce susceptibility to bending and buckling of the micro-truss structure 15 under a load. The selected architecture may be symmetrical or asymmetrical, as desired. The architecture may also be selected to optimize strength and stiffness of the micro-truss structure 15. One of ordinary skill in the art should further understand that other architectures for micro-truss structure 15 may be employed, as desired.

Exemplary architectures of the micro-truss structure 15 are described by Jacobsen in U.S. Pat. No. 7,382,959 and U.S. patent application Ser. No. 11/801,908. For example, the plurality of first truss elements may be defined by a plurality of first self-propagating polymer truss waveguides. The plurality of second truss elements may be defined by a plurality of second self-propagating polymer truss waveguides. The plurality of third truss elements may be defined by a plurality of third self-propagating polymer truss waveguides. The first, second, and third waveguides may be formed from a liquid photomonomer that exhibits a shift in index of refraction upon photopolymerization, for example. Alternatively, it should be appreciated that the micro-truss structure 15 may be formed from a material that does not form via a shift in index of refraction to form a polymer waveguide, such as by controlled radiation exposure of a substantially solid radiation-sensitive polymer as described herein. Other suitable means of forming the micro-truss structure 15 may be employed as desired.

One of ordinary skill in the art should appreciate that the particular micro-truss structure 15 can be designed as desired, for example, by at least one of: 1) selecting the angles and the patterns of the polymer truss elements with respect to one another, 2) adjusting the packing, or relative density of the resulting cellular structure, and 3) selecting the cross-sectional shapes and dimensions of the polymer truss elements.

In particular, polymer truss elements having an elliptical truss cross-sectional shape may militate against degradation with differences in coefficient of thermal expansion. Other cross-sectional shapes may also be employed, as desired.

In certain illustrative embodiments, the polymer of the micro-truss structure 15 may be converted to a metal oxide or ceramic to provide the desirable level of bending strength. For example, ceramic micro-truss structures 15 and methods for preparing ceramic micro-truss structures 15 are disclosed by Gross et al in U.S. patent application Ser. No. 12/074,727, the entire disclosure of which is hereby incorporated herein by reference.

The flow field layer 16 according to the present disclosure includes a plurality of reactant flow channels 20. The reactant flow channels 20 are formed from a plurality of first channel walls 24 extending along a length of the fuel cell component 10, 11. As shown in FIG. 2, the flow field layer 16 may also include a plurality of coolant channels 22. The coolant channels 22 are formed from the plurality of first channel walls 24 and a plurality of second channel walls 26 also extending along the length of the fuel cell component 10, 11. When the flow field layer 16 is formed from the liquid photomonomer, for example, the first channel walls 24 may be defined by a plurality of first self-propagating polymer wall waveguides extending along one direction and the second channel walls 26 may be defined by a plurality of second self-propagating polymer wall waveguides extending along another direction. The first and second channel walls 24, 26 may interpenetrate each other at a plurality of junctions 28. As a nonlimiting example, the first and second channel walls 24, 26 may form substantially V-shaped coolant channels 22. In certain embodiments, the reactant flow channels may also be formed from the first and second channel walls 24, 26. It should be appreciated that forming the reactant flow channels and coolant channels 20, 22 as open V-shapes may allow recovery of excess radiation-sensitive materials used during manufacture of the fuel cell components 10, 11. The junctions 28 may be disposed adjacent one of the substrate 12 and the diffusion medium layer 14 as shown in FIG. 2, as desired.

The flow field layer 16 may further include a plurality of spaced apart support ligaments 30 that facilitate a flow of reactants or coolant though the flow field layer 16 and militate against an undesirable flexing of the first and second channel walls 24, 26 under typical fuel cell operating conditions. The support ligaments 30 may further be adapted to carry current within the fuel cell. Like the truss elements of the micro-truss structure 15, the support ligaments 30 may have an elliptical cross-sectional shape or other cross-sectional shape as desired.

The support ligaments 30 are disposed between the first and second channel walls 24, 26 and one of the substrate 12 and the diffusion medium layer 14. When the flow field layer 16 is formed from the liquid photomonomer, for example, the support ligaments 30 may be defined by a plurality of self-propagating polymer ligament waveguides. In certain embodiments, at least one of the support ligaments 30 may intersect another of the support ligaments 30 adjacent one of the substrate 12 and the diffusion medium layer 14. In particular, the support ligaments 30 may be designed to intersect adjacent the diffusion medium layer 14 for rigidity and to avoid undesirably flexing and cracking of the first and second channel walls 24, 26.

The radiation-sensitive materials employed to form at least one of the diffusion medium layer 14 and the flow field layer 16 according to the present disclosure includes radiation-curable materials and radiation-dissociable materials. The term "radiation-curable material" is defined herein as any material that is at least one of initiated, polymerized, and crosslinked by exposure to radiation. It should be appreciated that an increase in temperature may also be employed to at least partially complete polymerization or crosslinking of the radiation-curable materials following an initiation by the exposure to radiation. The term "radiation-dissociable material" is defined herein as any material that exhibits at least one of a scissioning of the polymer backbone and a decrosslinking by exposure to radiation. As a nonlimiting example, the radiation-dissociable material may be made solvent-soluble by a sufficient breakage of crosslinks and/or scissioning of the polymer backbone of the radiation-dissociable material.

As nonlimiting examples, the radiation-curable materials may include one of a liquid photomonomer and a substantially solid radiation-curable polymer. The liquid photomonomer may be a monomer as described by Jacobsen in U.S. Pat. No. 7,382,959 and U.S. application Ser. No. 11/801,908. Nonlimiting examples of suitable photomonomers include monomers that polymerize via free-radical polymerization when exposed to UV radiation (wavelength between about 250 nm and about 400 nm). The photomonomer may include any suitable free-radical photopolymer material such as urethanes (polyurethanes), acrylates, methacrylates, and cationic polymers such as photo-cured epoxies. Other suitable photomonomers may also be employed.

Suitable substantially solid radiation-curable polymers may include negative resist polymers. Negative resist polymers go through a photoinitiation process that leads to a curing of the negative resist polymer by polymerization or polycondensation, for example. Where the polymerization or polycondensation reaction occurs at substantially the same time, the process is referred to as "photocured". Where only the reaction species are generated by the photoinitiation process and a subsequent step such a heating is required to generate the polymerization or polycondensation, the process is referred to as "photoinitiated". It should be appreciated that even though a post-cure heat treatment may be necessary to finalize the polymerization step, substantially stable radiation-cured features in the negative photoresist polymer may also be created during the initial radiation exposure. The substantially solid radiation-curable polymers can go through just the initiation process and, due to inherent stability and the limited diffusion rate of the chemical species within the solid radiation-curable polymers, the curing process may also be performed much later without significant feature degradation. It should be appreciated that most photoinitiated polymers begin the curing process at the inception of the initiation process, but the kinetics of the reaction at the exposure temperature are so slow that little, if any, polymerization or polycondensation may take place prior to heating the negative resist polymer to a desired curing temperature.

One particular negative resist polymer is the epoxy-based SU-8 2000™ negative resist polymer, commercially available from Microchem Corporation in Newton, Mass. The SU-8 2000™ negative resist polymer is curable by UV radiation. It should be appreciated that other substantially solid radiation-curable polymers may be employed. For example, similar to the photomonomers described above, the radiation-curable polymer selected may be cured with radiation of wavelengths other than UV radiation, as desired. The radiation-curable polymer may also be selected to have a slower cure rate than the liquid photomonomer, for example, to militate against features from appearing in the slower curing layer with exposure of the faster curing layer to a radiation source.

As a nonlimiting example, the radiation-dissociable materials may include positive resist polymers. Positive resist polymers begin as crosslinked polymers but may contain photoinitiators that, when exposed to a particular radiation, generate chemical species which dissociate the polymer by at least one of breaking the crosslinks and scissioning the polymer backbone. The dissociation makes the positive resist polymer soluble in the regions which have been exposed to the radiation. Regions where the positive resist polymer remains cured are masked rather than being exposed, as is the case with the negative resist polymers described hereinabove. In certain embodiments, the positive resist polymers are sensitive to radiation, e.g., ultraviolet or electron beam, without the need for photoinitiators. For example, the positive resist polymer may itself be damaged by the radiation and the remaining scissioned chains become soluble in a solvent. Other types of positive resist polymers may be employed, as desired.

The radiation employed to one of cure and dissociate the radiation-sensitive materials may include a UV beam from a Mercury arc lamp, for example. The radiation may be electromagnetic radiation or particle radiation, as desired. A skilled artisan understands that radiation of other wavelengths, such as infrared, visible light, and X-ray radiation, and from other sources, such as incandescent lights and lasers, may also be employed. Particle radiation such as an electron beam from a cathode ray source may also be employed. It should be further understood that the radiation may be collimated, partially collimated, or non-collimated, as desired.

The radiation is typically directed to the radiation-sensitive material via at least one mask having apertures or openings formed therein, through which the radiation may contact the radiation-sensitive material. The apertures may be substantially radiation transparent apertures formed in an otherwise opaque or radiation-blocking material, for example. The mask may be formed from a plane of glass or a Mylar sheet, for example, and facilitate the directing of radiation beams at an angle relative to either the mask or the underlying substrate 12. The mask may be lifted away after an exposure and cleaned for reuse. The apertures or openings formed in the mask have shapes that provide radiation beams to form polymer structures with a desired cross-sectional shape. The apertures may be substantially circular to create elliptical cross-sectional shapes that may better adjust to differences in coefficient of thermal expansion (CTE) within the fuel cell component 10, 11.

In one illustrative embodiment, the mask surface has a plurality of holes. The holes may each have a diameter of about 10 microns, for example. In another embodiment, the apertures are elongate slots that provide radiation sheets to form polymer walls with substantially rectangular cross-sectional shapes, for example, to form the at least one of the reactant flow channels 20 and the coolant channels 22 of the fuel cell component 10, 11. The exposure to radiation may be conducted intermittently in a series of short exposures, for example, or in longer durations to provide the desired structural design. A skilled artisan may select suitable masks materials, aperture and opening sizes and shapes, and resulting structural configurations, as desired.

Figure 3:
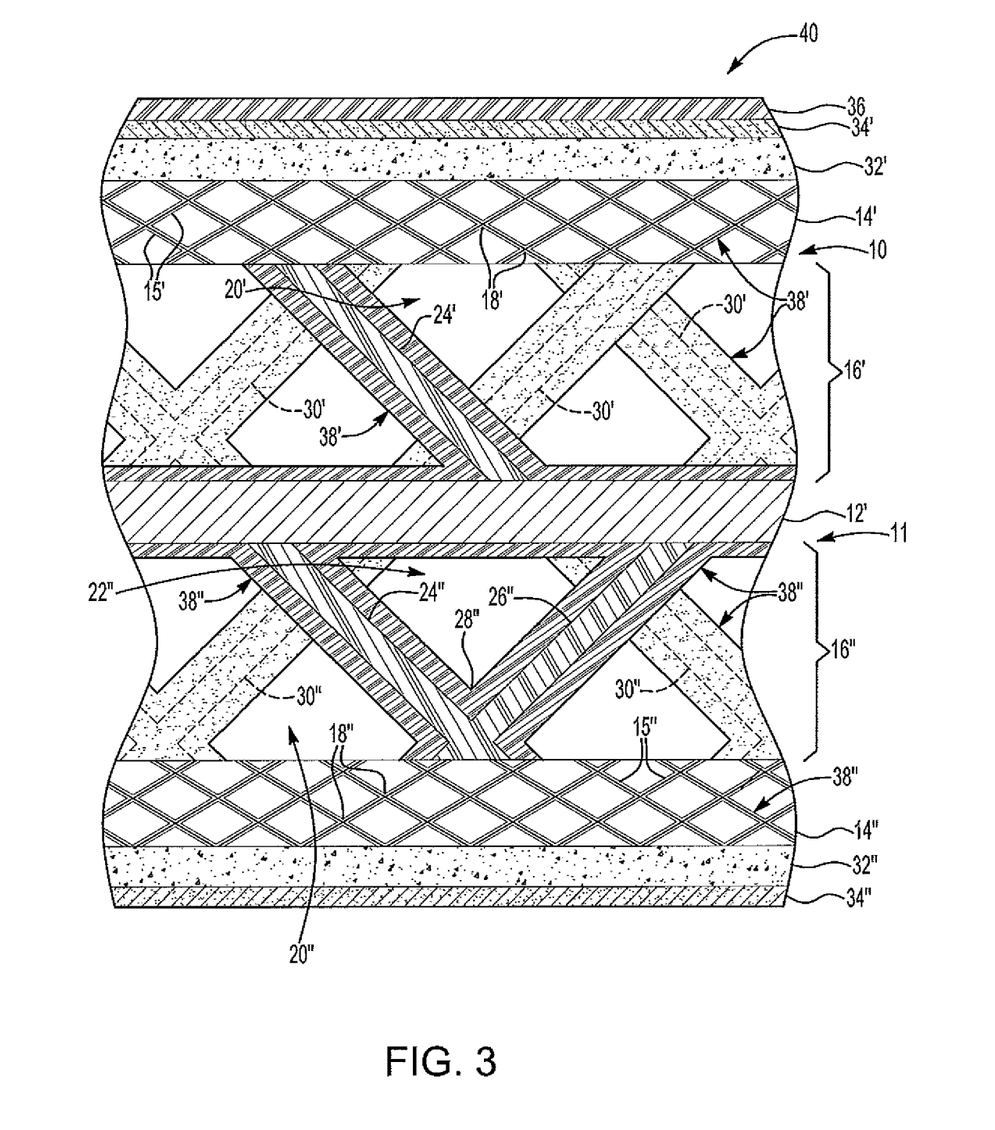
FIG. 3 is a fragmentary side cross-sectional view of a repeating fuel cell unit manufactured with the fuel cell components shown in FIGS. 1 and 2 having electrically conductive coatings.

Referring to FIG. 3, like structure from FIGS. 1 and 2 have the same reference numeral and a prime (') or double prime (") for purpose of clarity. At least one of the diffusion medium layer 14', 14" and the flow field layer 16', 16" may further be coated with an electrically conductive material 38', 38". For example, at least one of the diffusion medium layer 14', 14" and the flow field layer 16', 16" may be plated with a metal coating that is substantially oxidation resistant, reduction resistant, and acid-resistant. The metal coating may be formed in multiple plating steps. For example, the metal coating may be formed by application of a first layer of an electroless nickel base followed by a second layer of NiCr or Cr plating for corrosion resistance and a third layer of an overcoating with Au or Pd for the minimization of contact resistance between the diffusion medium layer 14', 14" and the flow field layer 16', 16". The first layer and the second layer may be plated on, and the third layer applied by physical vapor deposition to limit coverage, for example. Other methods for coating the electrically conductive material 38', 38" onto the at least one of the diffusion medium layer 14', 14" and the flow field layer 16', 16", may be employed as desired.

In certain embodiments the electrically conductive material 38', 38" includes a noble metal selected from the group consisting of: ruthenium (Ru), rhodium (Rh), palladium (Pd), silver (Ag), iridium (Ir), platinum (Pt), and osmium (Os), and alloys thereof. In a particular embodiment, the electrically conductive material 38', 38" is gold (Au). In another particular embodiment, the electrically conductive material 38', 38" is tantalum (Ta). Another suitable metal coating may include nickel (Ni) alloys, such as alloys of nickel and chromium (Cr) or nickel and cobalt (Co). As should be recognized by one of ordinary skill in the art, the electrically conductive material 38', 38" may include mixtures or alloys of the above identified metals. Other electrically conductive metals and materials may also be employed, as desired.

The electrically conductive material 38', 38" may be deposited on at least one of the diffusion medium layer 14', 14" and the flow field layer 16', 16" by one of electron beam evaporation, magnetron sputtering, physical vapor deposition, chemical vapor deposition, atomic layer deposition, electrolytic deposition, electroless deposition, flame spray deposition, brush plating, and other like processes for example. Solution based electroplating techniques that include immersing the at least one of the diffusion medium layer 14', 14" and the flow field layer 16', 16" in a plating bath may also be employed. Application of electrically conductive material 38', 38" in the form of a slurry powder and subsequently firing the slurry powder to form the coating may also be used. A skilled artisan may select more than one deposition technique to take into account differences between line of sight and non-line of sight characteristics of the deposition techniques selected. In certain embodiments, the electrically conductive material may be substantially evenly deposited on both the interior and exterior surfaces of the diffusion medium layer 14', 14" and the flow field layer 16', 16". In other embodiments, the coating of the electrically conductive material 38', 38" on the diffusion medium layer 14', 14" may have less thickness than the coating of the electrically conductive material 38', 38" on the flow field layer 16', 16". Suitable means for coating and thicknesses of the electrically conductive material 38', 38" may be selected as desired.

It should be understood that at least one of the diffusion medium layer 14', 14" and the flow field layer 16', 16" may be formed from radiation-sensitive material that is electrically conductive when cured. Where the radiation-sensitive material is electrically conductive, the coating of the electrically conductive material 38', 38" on at least one of the diffusion medium layer 14', 14" and the flow field layer 16', 16" may not be employed, as desired.

The first and second fuel cell components 10, 11 may also have an at least one microporous layer 32', 32" and an at least one electrode 34', 34". The microporous layer 32', 32" may be disposed on the diffusion medium layer 14', 14". The electrode 34', 34" may be disposed on the microporous layer 32', 32' opposite the diffusion medium layer 14', 14". It should be appreciated that the electrode 34', 34" may also be disposed directly on the diffusion medium layer 14', 14", as desired.

One of the electrodes 34', 34" may further have a polymer electrolyte membrane (PEM) 36 disposed thereon.

As shown in FIG. 3, the first and second fuel cell components 10, 11 may be assembled to form a single repeating unit 40 for a fuel cell. A plurality of the repeating units 40 may be stacked together to form a fuel cell stack (not shown). The repeating unit 40 includes the first diffusion medium layer 14' and the second diffusion medium layer 14'. The first diffusion medium layer 14' has the micro-truss structure 15' with the nodes 18'. The second diffusion medium layer 14" includes the micro-truss structure 15" with the nodes 18". The repeating unit 40 further includes the flow field layer 16' and the second flow field layer 16". The flow field layer 16' includes the first channel walls 24', intersecting and the plurality of support ligaments 30'. The second flow field layer 16" includes the first and second channel walls 24", 26" intersecting at the junction 28", and the plurality of support ligaments 30". The substrate 12' of the first fuel cell component 10 is disposed between the first and second flow field layers 16', 16". The substrate 12' and the first and second flow field layers 16', 16" are further disposed between the first and second diffusion medium layers 14', 14". Each of the diffusion medium layers 14', 14" has one microporous layer 32', 32" disposed thereon. Each of the microporous layers 32', 32" has one of the electrodes 34', 34" applied thereto opposite the diffusion medium layer 14', 14". One of the electrodes 34', 34" has a polymer electrolyte membrane 36 disposed thereon.

Referring to FIGS. 4 and 5, like structure from FIGS. 1, 2, and 3 have the same reference numeral and a prime (') or double prime (") for purpose of clarity. An alternate fuel cell component 10' according to the present disclosure is illustrated in FIG. 4 and is provided for forming a single repeating unit 40' for the fuel cell as shown in FIG. 5.

The fuel cell component 10' includes the first and second diffusion medium layers 14', 14" and the single flow field layer 16. The flow field layer 16 is formed from a plurality of electrically conductive walls 42 that define the plurality of reactant flow channels 20 and the plurality of coolant channels 22. The electrically conductive walls 42 may be formed, for example, by disposing the coating of the electrically conductive material 38 on a plurality of removable negative cores, and subsequently removing the cores to leave the electrically conductive material 38 as the walls 42. Other means for forming the electrically conductive walls 42 may also be used.

The substrate 12 may be coupled with the flow field layer 16. As a nonlimiting example, the coating 38 forming the electrically conductive walls 42 may also be disposed over the substrate 12 to bind the substrate 12 with the flow field layer 16. The flow field layer 16 is disposed between the first and second diffusion medium layers 14', 14". One of the diffusion medium layers 14', 14" has a membrane electrode assembly (MEA) 44 disposed thereon. The membrane electrode assembly 44 includes the microporous layers 32', 32", the electrodes 34', 34", and the PEM 36. The flow field layer 16 provides the plurality of reactant flow channels 20 and the plurality of coolant channels 22. As shown, the plurality of reactant flow channels 20 formed by the flow field layer in the alternate fuel cell component 10' includes reactant flow channels 20 formed adjacent the first diffusion medium layer 14' and reactant flow channels 20 formed adjacent the second diffusion medium layer 14". A perforation, slot, or a series of holes 46 is formed though the substrate 12 and cooperates with the flow field layer 16 to provide fluid communication between the plurality of reactant flow channels 20 adjacent the second diffusion medium layer 14". It should be appreciated that the alternate structure of the fuel cell 10' thereby facilitates the formation of the single repeating unit 40' for the fuel cell without requiring an assembly of the first and second fuel cell components 10, 11 as shown in FIGS. 1 to 3.

The present disclosure includes a method for fabricating the repeating unit 40 for the fuel cell. The method first includes the steps of: providing the first fuel cell component 10 and providing the second fuel cell component 11. The first fuel cell component 10 is disposed on the second fuel cell component 11. The first substrate 12' is disposed adjacent the second flow field layer 16" of the second fuel cell component 11. The second substrate 12" on the second fuel cell component 11 is removed from the second fuel cell component 11, one of before and after the second fuel cell component 11 is disposed onto the first fuel cell component 10, as desired. The first and second fuel cell components 10, 11 may be joined with a heavy plating process, for example, to close the V-shaped coolant channels 22". Electrically conductive positioning adhesives may be used to join the first and second fuel cell components 10, 11. Other suitable means for joining the first and second fuel cell components 10, 11 in a desirably sealed and electrically conductive manner may also be employed.

The first microporous layer 32' is then disposed on the first diffusion layer 14' and the second microporous layer 32" is disposed on the second diffusion layer 14". The first electrode 34' is disposed on the first microporous layer 32' and the second electrode 34" is disposed on the second microporous layer 32". The PEM 36 is then disposed on one of the first and second electrodes 34', 34" to complete the repeating unit 40 for the fuel cell. The assembly of the microporous layers 32', 32", electrodes 34', 34", and PEM 36 may occur before or after the joining of the first fuel cell component 10 with the second fuel cell component 11, as desired.

The step of providing the first fuel cell component 10 may further include the steps of providing the first substrate 12' and disposing a radiation-sensitive material on the first substrate 12'. For example, the first substrate 12' may be immersed in a volume of liquid photopolymer. A first mask is then placed between the at least one radiation source and the radiation-sensitive material. The first mask extends along a single plane and has a plurality of elongate slots formed therein. The first mask may be selected to provide a desired flow field geometry having the plurality of first polymer walls 24'. The radiation-sensitive material is then exposed to a plurality of radiation sheets directed through the elongate slots of the first mask to form the flow field layer 16' having the plurality of reactant flow channels 20'.

Following the formation of the flow field layer 16', a second radiation-sensitive material is applied to the flow field layer 16'. The second radiation-sensitive material may be the same as, or different from, the radiation-sensitive material, as desired. As a nonlimiting example, a substantially solid radiation-sensitive polymer may be laminated on the flow field layer 16'. A second mask is placed between the at least one radiation source and the second radiation-sensitive material. The second mask may be selected to provide a desired diffusion medium geometry. The second mask extends along a single plane and has a plurality of apertures. The second radiation-sensitive material is exposed to a plurality of radiation beams directed through the apertures of the second mask to form the first diffusion medium layer 14' having the desired micro-truss structure 15'.

The step of providing the second fuel cell component 11 may further include the steps of providing the second substrate 12" and applying a third radiation-sensitive material to the second substrate 12". The third radiation-sensitive material may be the same as, or different from, the first and second radiation-sensitive materials. As a nonlimiting example, the second substrate 12" may be laminated with a substantially solid radiation-sensitive polymer. A thickness of the third radiation-sensitive material applied to the second substrate 12" may be selected based on a desired thickness of the uncompressed diffusion medium layer 14" to be manufactured with the third radiation-sensitive material. A third mask is then placed between at least one radiation source and the third radiation-sensitive material. The third mask extends along a single plane and has a plurality of apertures formed therein. The third radiation-sensitive material is subsequently exposed to a plurality of radiation beams from the radiation source from one or more directions, for example, simultaneously or sequentially, as desired. The radiation beams are directed to the third radiation-sensitive material through the apertures formed in the third mask. The radiation beams cause the micro-truss structure 15" to form the second diffusion medium layer 14".

Following the formation of the micro-truss structure 15", the third mask is removed from the second diffusion medium layer 14". A fourth radiation-sensitive material is then applied to the second diffusion medium layer 14". The fourth radiation-sensitive material may be the same as, or different from, the first, second, and third radiation-sensitive materials. As a nonlimiting example, the fourth radiation-sensitive material is a volume of liquid photopolymer. A fourth mask is placed between the at least one radiation source and the fourth radiation-sensitive material. The fourth mask may extend along a single plane and have a plurality of elongate slots formed therein. The fourth radiation-sensitive material is then exposed to a plurality of radiation sheets directed through the elongate slots of the fourth mask to form the second flow field layer 16" having the plurality reactant flow channels 20" and the plurality of V-shaped coolant channels 22".

It should be appreciated that, to form the desired micro-truss structure 15', 15", the radiation beams may include a first radiation beam, a second radiation beam, and a third radiation beam. The first, second, and third radiation beams are directed from the at least one radiation source toward at least one aperture to respectively form the first, second and third polymer truss elements in a portion of the volume of the radiation-sensitive material. In the case of the photomonomer, the polymer truss elements may be formed from polymer waveguides having a different refraction index than the surrounding photomonomer.

As a nonlimiting example, the first radiation beam may be directed at a first angle with respect to the single plane and the second radiation beam is directed at a second angle with respect to the single plane; the second angle being different from the first angle. The third radiation beam may be directed at a third angle with respect to the single plane; the third angle being different from the first angle and the second angle. The first polymer truss element forms a fourth angle with respect to the single plane; the fourth angle corresponding to the first angle. The second polymer truss element forms a fifth angle with respect to the single plane; the fifth angle corresponding to the second angle. The third polymer truss element forms a sixth angle with respect to the single plane; the sixth angle corresponding to the third angle. Each of the first, second and third polymer truss elements may intersect each other to form the micro-truss structures 15', 15". It should be understood, however, that at least a portion of the truss elements may be selected to not intersect, as desired.

The method for fabricating the repeating unit 40 for the fuel cell further includes the step of coating at least one of the first diffusion medium layer 14', the second diffusion medium layer 14", the flow field layer 16', and the second flow field layer 16" with the electrically conductive coating 38', 38", as described hereinabove. It should be appreciated that the electrically conductive coating 38', 38" may minimize contact resistance and optimize an efficiency of the fuel cell.

The present disclosure includes another method for fabricating the repeating unit 40' for the fuel cell. The method includes the steps of providing the substrate 12 and applying a radiation-sensitive material to the substrate 12. For example, the substrate 12 may be immersed in a volume of liquid photopolymer. The substrate 12 may be provided with the plurality of perforations or holes 46 formed therein. The first mask is then placed between at least one radiation source and the radiation-sensitive material. The first mask extends along a single plane and has a plurality of apertures. The radiation-sensitive material is then exposed to a plurality of radiation beams directed through the apertures of the first mask to the radiation-sensitive material to form a plurality of negative removable cores. The negative removable cores may also be formed by other means, such as screen printing, for example. The first mask is removed from the negative removable cores and the residual uncured radiation-sensitive material. It should be appreciated that the term "uncured radiation-sensitive material" may also include dissociated radiation-sensitive material within the scope of the present disclosure. The remaining uncured volume of the radiation-sensitive material may subsequently be removed, for example, by draining in the case of photomonomer, and recycled. The step of removing the residual uncured volume of radiation-sensitive material may include rinsing the substrate and the cores with a solvent. One of ordinary skill in the art should appreciate that suitable solvents do not substantially degrade the exposed negative removable cores.

The removable cores have the negative shape of the walls 42 desired to form the plurality of reactant flow channels 20 and the plurality of coolant channels 22. The step of forming the plurality of negative removable cores may include exposing the radiation-sensitive material to a plurality of inclined and vertical radiation beams, for example.

A second radiation-sensitive material is disposed on the negative removable cores and a third radiation-sensitive material is disposed on the substrate 12. As nonlimiting examples, the second and third radiation-sensitive materials may be substantially solid radiation-sensitive polymers laminated on each of the negative removable cores and the substrate 12. The substrate 12 and the negative removable cores are coated with the electrically conductive coating 38. It should be appreciated that a mask or other physical covering, such as a physical contact with another surface, may be employed on the outer surface of the laminated radiation-sensitive polymer to militate against undesirably heavy plating from forming thereon during the application of the electrically conductive coating 38.

A second mask is then placed between the at least one radiation source and the second radiation-sensitive material, and the second radiation-sensitive material is exposed to a plurality of radiation beams to form the first diffusion medium layer 14' having the micro-truss structure 15'. A third mask is placed between the at least one radiation source and the third radiation-sensitive material, and the third radiation-sensitive material is exposed to a plurality of radiation beams to form the second diffusion medium layer 14" having the micro-truss structure 15". The first, second, and third radiation-sensitive materials may be the same, or different, as desired. The negative removable photopolymerized cores and the uncured second and third radiation-sensitive materials are removed to leave the walls 42 formed by the electrically conductive coating 38.

The method further includes the steps of coating of the first and second diffusion medium layers 14', 14" with the electrically conductive material 38. It should be understood, however, that the coating disposed on the diffusion medium layers 14', 14" may be of lesser thickness than the coating disposed on the negative removable cores that form the walls 42 of the flow field layer 16'. One of ordinary skill in the art may select suitable electrically conductive coating thicknesses for each of the layers, as desired.

To complete the repeating unit 40' for the fuel cell, the MEA 44 is applied to one of the first and second diffusion medium layers 14', 14". The step of applying the MEA 44 includes the steps of: disposing the first microporous layer 32' on the first diffusion medium layer 14'; applying the first electrode 34' to the first microporous layer 32'; disposing the PEM 36 on the first electrode 34'; applying the second electrode 34" to the PEM 36; and disposing the second microporous layer 32" on the second electrode 34".

In relation to the repeating units 40, 40' described herein, further manifold apertures (not shown) typically associated with the formation of inlet and outlet manifolds of the fuel cell may also be provided. Likewise, seal and port features that facilitate the assembly and operation of the fuel cell may be provided. The manifold apertures, seals, and port features may be formed by conventional means or through use of the polymerization techniques described hereinabove.

It is surprisingly found that the employment of micro-truss structures 15, 15', 15" allows for the cost effective production of fuel cell components 10, 10', 11 employed to form fuel cells for automotive and other applications, such as micro-fuel cells for portable devices. The fuel cell components 10, 10', 11 of the present disclosure employ polymers formed in the shape of the desired fuel cell part as opposed to forming negative shaped removable cores. The present disclosure expands the design features available from the known micro-truss processes to produce a greater variety of features desirable for production fuel cell components such as diffusion media, separator plates, and membrane reinforcement.

The highly ordered structure of the fuel cell components 10, 10', 11, 40, 40' fabricated by the methods of the present disclosure provides a more uniform compression and increased durability in comparison to conventional polymer foam parts. The present fabrication methodology is also less expensive than conventional forming methods, and allows the fuel cell components to be fabricated with significantly reduced lead times. In particular, production cost reductions may result from replacement of the conventional carbon paper diffusion media, and by militating against costs typically associated with forming desirable contact resistance interfaces between conventional and separately manufactured fuel cell components.

A method for fabricating a fuel cell component 100 according to another embodiment of the invention is illustrated in FIGS. 6A-6G and FIGS. 7A-7B. As depicted in FIGS. 1-5 described hereinabove, the fuel cell component 100 is a composite with an architecture that varies across a thickness thereof. Like or related structure from FIGS. 1-5 that is shown in FIGS. 6A-6G and FIGS. 7A-7B has the same reference numeral in a 100-series for purpose of clarity.

Figure 6A:
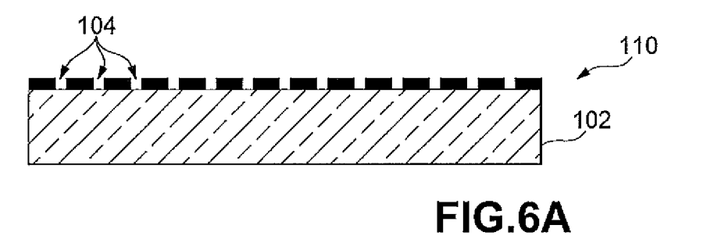
FIGS. 6A-6G are schematic side cross-sectional views illustrating a method for manufacturing a fuel cell component according to a further embodiment of the present disclosure.

As shown in FIG. 6A, the method for fabricating the fuel cell component 100 may include the step of providing a mask 102 having at least one radiation transparent aperture 104. The at least one radiation transparent aperture 104 permits a plurality of radiation beams 106 (shown in FIG. 6E) to be directed therethrough. The mask 102 may include a radiation transparent material coated with a radiation opaque material. The radiation opaque material may have a plurality of holes defining the radiation transparent apertures 104 of the mask 102. The radiation transparent apertures of the mask 102 may be substantially circular, for example. In a particular example, the radiation transparent material is glass such as a Pyrex® glass wafer, and the radiation opaque material is a patterned chromium coating that is spin coated onto the glass. Other radiation transparent and radiation opaque materials for the mask 102, and shapes of the at least one radiation transparent aperture 104, may also be employed within the scope of the present disclosure.

Figure 6B:
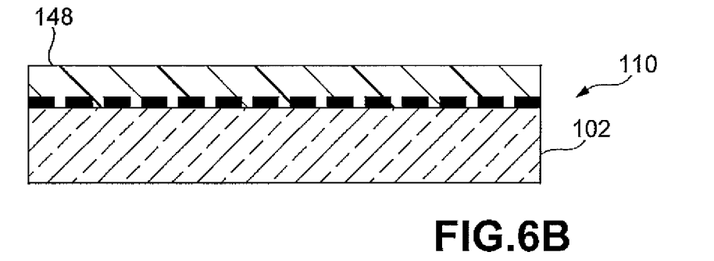
Figure 6C:
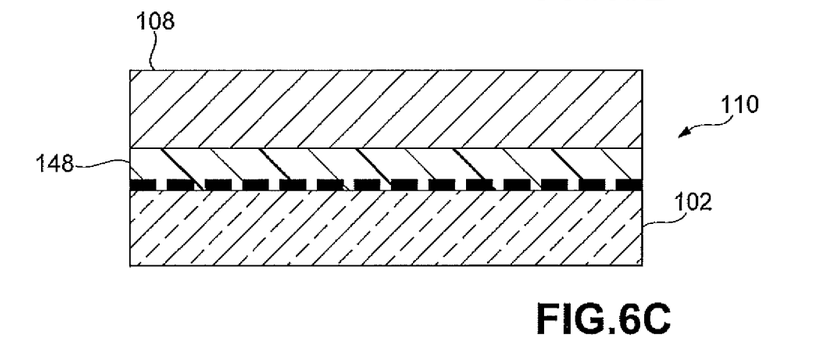

A radiation-sensitive material 108 having a sensitivity to the plurality of radiation beams 106 is also provided, for example, as shown in FIG. 6C. The radiation-sensitive material 108 may be selected from any of the classes of radiation-sensitive materials disclosed hereinabove. In a particular example, the radiation-sensitive material 108 is a negative resist polymer such as the epoxy-based SU-8 2000™ negative resist polymer, and the radiation beams 106 include collimated UV radiation. A skilled artisan should understand that other types of the radiation beams 106 and the radiation-sensitive materials 108 may also be used, as desired.

The present method includes the steps of providing a flow field layer 116. The flow field layer 116 may have a plurality of radiation-cured flow channels. The flow field layer 116 may be provided, for example, as a free standing structure or fully formed on a substrate 112. Where the substrate 112 is employed, the flow field layer 116 may include adhesion promoters that facilitate a bonding of the flow field layer 116 to the substrate 112. The substrate 112 may be formed from metal, for example, and also function as the fuel cell plate such as the bipolar plate in the assembled fuel cell stack. In a particular embodiment, the substrate 112 is a stainless steel foil. The substrate may also be formed from other metals and electrically conductive composite materials, as desired.

Figure 6D:
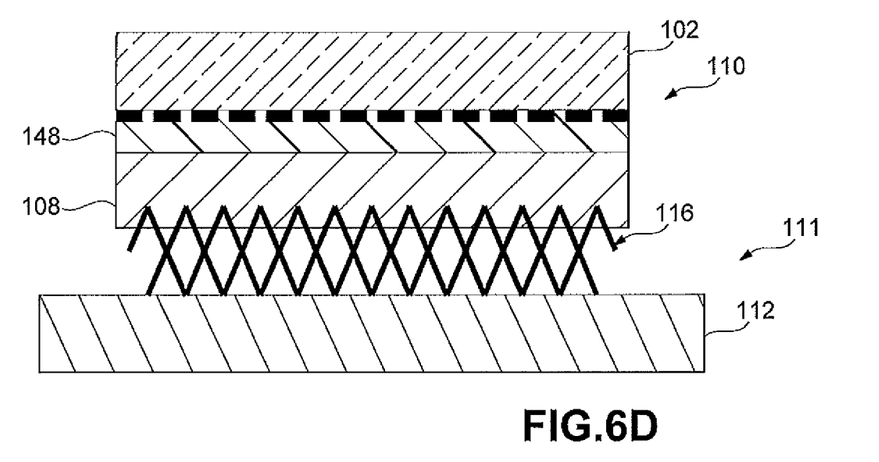

The radiation-sensitive material 108 is disposed on the flow field layer 116. For example, the flow field layer 116 may be pressed into the radiation-sensitive material 108 as shown in FIG. 6D. In particular embodiments, the flow field layer 116 is embedded in the radiation-sensitive material 108 when the radiation-sensitive material 108 is disposed on the flow field layer 116. The radiation-sensitive material 108 may be heated or "soft baked" prior to pressing the flow field layer 116 into the radiation-sensitive material 108, for example, to minimize residual stress. Where the epoxy-based SU-8 2000™ negative resist polymer is employed, the soft bake temperature may be about 95° C., although other temperatures may also be used. In other embodiments, the radiation-sensitive material 108 may be provided as a soft, solid phase material into which the flow field layer 116 is pressed without preheating the radiation-sensitive material 108.

Figure 6E:
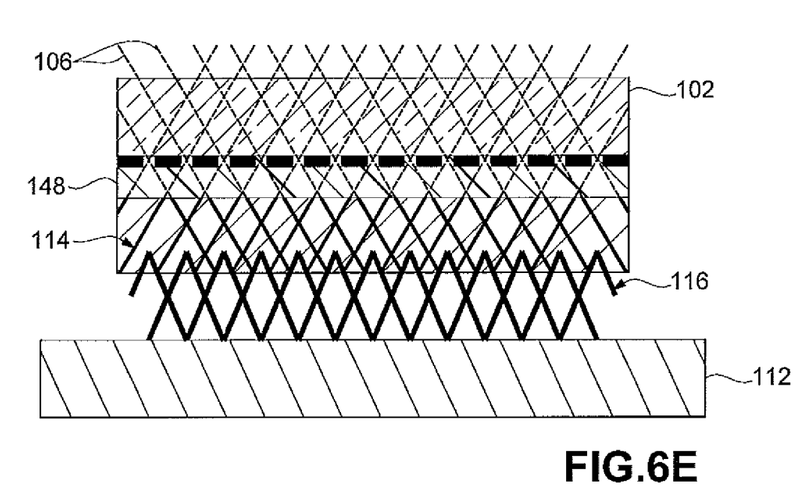

Following the pressing of the flow field layer 116 into the radiation-sensitive material 108, the radiation-sensitive material 108 is exposed to the plurality of radiation beams 106 through the radiation transparent apertures 104 in the mask 102. The exposure of the radiation-sensitive material 108 to the radiation beams 106 forms a diffusion medium layer 114 with a micro-truss structure in the radiation-sensitive material 108. Additional heating after exposure may also be used to accelerate the formation of the diffusion medium layer 114. Due to the embedding of the flow field layer 116 in the radiation-sensitive material 108, the micro-truss structure of the diffusion medium layer 108 is interlocked and bonded with the flow field layer 116 after the diffusion medium layer 114 is formed. The fuel cell component 100 is thereby provided.

The present method may further employ a sacrificial release layer 148, for example, as shown in FIG. 6B. The sacrificial release layer 148 may be applied to the mask 102 prior to disposing the radiation-sensitive material 108 thereon. For example, the sacrificial release layer 148 may be spin coated onto the mask 102, although skilled artisans understand that other methods for applying the sacrificial release layer 148 may also be used. The sacrificial release layer 148 is particularly disposed between the mask 102 and the radiation-sensitive material 108. Thus, the radiation-sensitive material 108 may be applied, for example, by spin coating or other application method, onto sacrificial release layer 148 after the sacrificial release layer has been applied to the mask 102.

The sacrificial release layer 148 is formed from a material that is substantially transparent to the plurality of radiation beams 106 to which the radiation-sensitive material 108 is sensitive. The material forming the sacrificial release layer 148 is also selected to dissolve in a solvent that does not otherwise degrade radiation-cured structures formed from the radiation-sensitive material 108. Where UV radiation is employed, for example, the sacrificial release layer 148 may be polystyrene. The polystyrene may be deposited by spin coating a diluted solution of polystyrene-toluene over the mask 102. Other suitable materials for the sacrificial release layer 148 may also be employed, as desired.

Figure 7A:
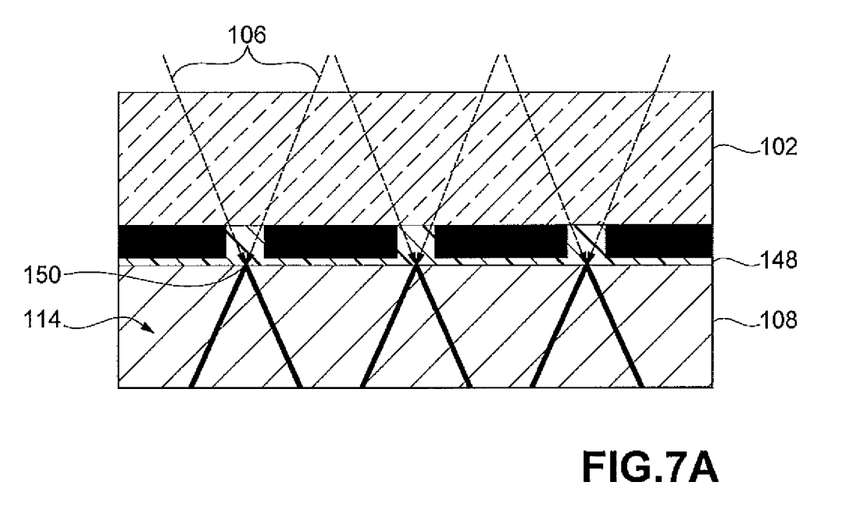
FIGS. 7A-7B illustrate a modification to truss spacing dependant upon a location of a mask relative to a layer of radiation-sensitive material.
Figure 7B:
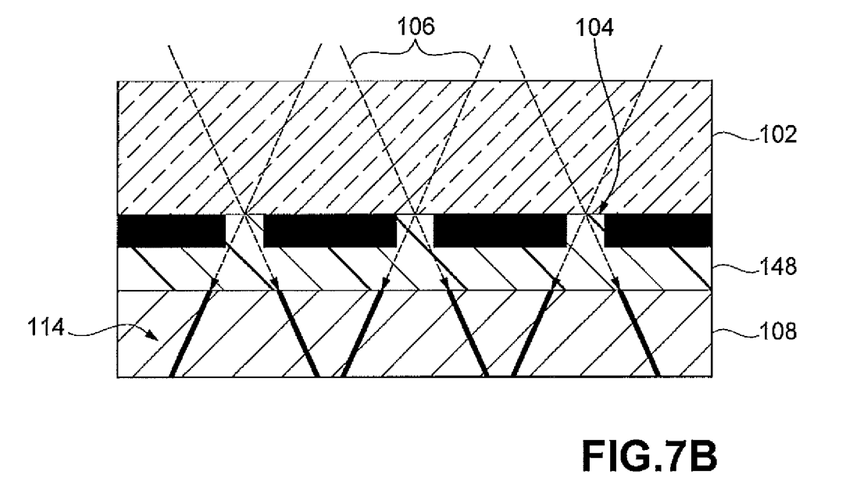

With reference to FIGS. 7A and 7B, it is shown that selecting a thickness of the sacrificial release layer 148 can affect the shape of the resulting radiation-cured structure formed in the radiation-sensitive material 108. For example, where a minimal thickness of the sacrificial release layer 148, for example, approximately 2 µm, is used (FIG. 7A), individual truss members of the micro-truss structure forming the diffusion medium layer 114 branch out from a single node 150. The single node 150 may be defined by a location of one of the radiation transparent apertures 104 of the mask 102. Where a greater thickness of the sacrificial release layer 148 is used (FIG. 7B), the individual trusses form in between the nodes 150 of the truss network. This increases a contact surface area of the diffusion medium layer 114 when formed.

One of ordinary skill in the art understands that the increased contact surface area is desired as the same minimizes localized stresses on an adjacent membrane electrode assembly (not shown) during fuel cell operation without inhibiting fluid flow. In a particularly illustrative embodiment, the thickness of the sacrificial release layer 148 is approximately 35 µm. A skilled artisan may select other thicknesses for the sacrificial release layer 148, or may otherwise adjust a spacing between the mask 102 and the radiation-sensitive material 108 by positioning the mask 102 a distance from the radiation-sensitive material 108 during formation of the diffusion medium layer 114, as desired.

Figure 6F:
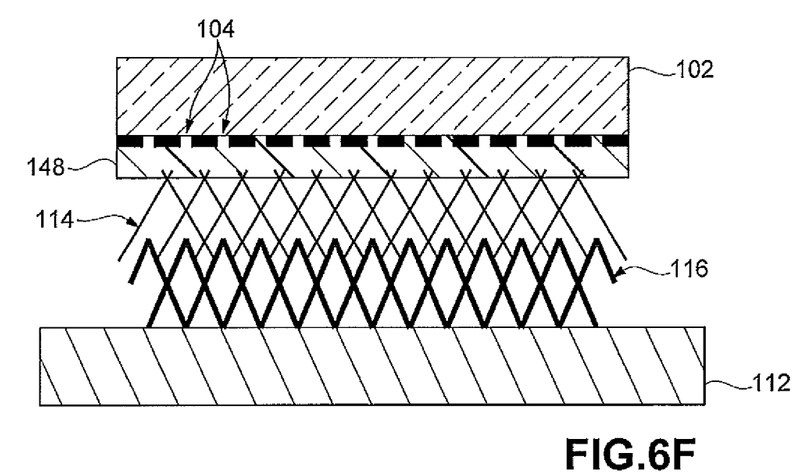
Figure 6G:
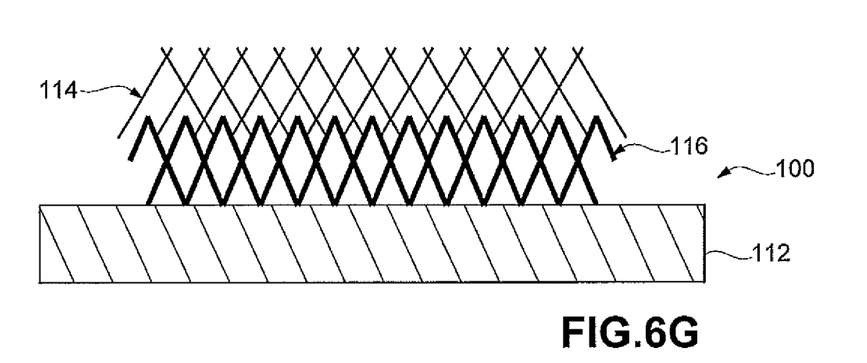

With renewed reference to FIGS. 6A-6G, the method of the present disclosure further includes the step of removing at least one of the mask 102 and the sacrificial release layer 148 from the diffusion medium layer 114 after the radiation-sensitive material 108 has been exposed to the plurality of radiation beams 106. The sacrificial release layer 148 may be removed by immersing the release layer 148 and the mask 102 in the solvent that dissolves the release layer 148 and permits removal of the mask 102. An uncured portion of the radiation-sensitive material 108 remaining after the radiation-sensitive material 108 is exposed to the plurality of radiation beams 106 may be cleaned from the diffusion medium layer 114 prior to dissolving the release layer in the solvent, for example, as shown in FIG. 6F.

As disclosed further hereinabove, the method may also include the steps of coating at least one of the diffusion medium layer 114 and the flow field layer 116 with an electrically conductive coating.

Although the fabrication method illustrated in FIGS. 6A-6G shows the forming of the diffusion medium layer 114 on the preformed flow field layer 116, it should be appreciated that the flow field layer 116 may alternatively be formed on the preformed diffusion medium layer 114 to provide the same quality of bonding therebetween. For example, the method for fabricating the fuel cell component 100 may include the steps of providing the diffusion medium layer 114 with the micro-truss structure, and disposing the radiation-sensitive material 108 on the diffusion medium layer 114. The radiation-sensitive material 108 is then exposed to the plurality of radiation beams 106 through the radiation transparent apertures 104 in the mask 102 to form the flow field layer 116.

In further alternative embodiments, the diffusion medium layer 114 and the flow field layer 116 of the fuel cell component 100 may be exposed and developed separately, and subsequently bonded by plating. For example, one of the diffusion medium layer 114 and the flow field layer 116 may be processed on the substrate 112, with the other processed as the free standing layer. In another example, one of the diffusion medium layer 114 and the flow field layer 116 may be processed on the substrate 112, and the other attached to a processing substrate (not shown), with or without the sacrificial release layer 148 to aid in removing the processing substrate. In a further example, each of the diffusion medium layer 114 and the flow field layer 116 may be processed as free standing layers, and then either bonded to each other and to the substrate, or one bonded to the substrate 112 and the other bonded to the one bonded to the substrate 112. Separate adhesives or adhesive layers may also be used to bond the respective layers.

The disclosed method integrates multiple layers to form the fuel cell component 100. It should be appreciated that the various layers are fabricated using different material systems and associated techniques to achieve a combination of thicknesses and feature sizes otherwise unachievable in the prior art, where such techniques and materials may be used individually.

Advantageously, the present method of forming the diffusion medium layer 114 directly on the flow field layer 116 militates against many issues specific to bonding between the respective layers. Attaching two fully-formed layers with different unit cell architectures using an adhesive layer is a difficult process step to implement, even under near ideal alignment of the layers. The present method results in bonding of the diffusion medium layer 114 to the flow field layer 116 as part of the formation process for the diffusion medium layer 114, and therefore does not require the adhesive layer.

While certain representative embodiments and details have been shown for purposes of illustrating the invention, it will be apparent to those skilled in the art that various changes may be made without departing from the scope of the disclosure, which is further described in the following appended claims.

What is claimed is:

1. A method for fabricating a fuel cell component, comprising the steps of:
providing a mask having a plurality of radiation transparent apertures, the plurality of radiation transparent apertures permitting a plurality of radiation beams to be directed therethrough;
providing a radiation-sensitive material having a sensitivity to the plurality of radiation beams;

providing a flow field layer;
disposing the radiation-sensitive material on the flow field layer;
exposing the radiation-sensitive material to the plurality of radiation beams through the radiation transparent apertures in the mask to form a diffusion medium layer with a micro-truss structure;
applying a sacrificial release layer to the mask, the sacrificial release layer being substantially transparent to the plurality of radiation beams; and
applying the radiation-sensitive material to the sacrificial release layer.

2. The method of claim 1, wherein the sacrificial release layer is spin coated onto the mask.

3. The method of claim 1, wherein the sacrificial release layer is formed from polystyrene.

4. The method of claim 1 further comprising the step of:
removing the mask and the sacrificial release layer from the diffusion medium layer after the radiation-sensitive material is exposed to the plurality of radiation beams.

5. The method of claim 4, wherein the sacrificial release layer is removed by immersing the release layer and the mask in a solvent that dissolves the release layer and permits removal of the mask.

6. The method of claim 5, wherein an uncured portion of the radiation-sensitive material remaining after the radiation-sensitive material is exposed to the plurality of radiation beams is cleaned from the diffusion medium layer prior to dissolving the release layer in the solvent.

7. The method of claim 1, wherein the flow field layer is embedded in the radiation-sensitive material when the radiation-sensitive material is disposed on the flow field layer, and wherein the micro-truss structure of the diffusion medium layer is interlocked with the flow field layer after the diffusion medium layer is formed.

8. The method of claim 1, wherein the mask is a radiation transparent material coated with a radiation opaque material, the radiation opaque material having a plurality of holes defining the radiation transparent apertures of the mask.

9. The method of claim 8, wherein the radiation transparent apertures of the mask are substantially circular.

10. The method of claim 8, wherein the radiation transparent material is glass and the radiation opaque material is a patterned chromium coating.

11. The method of claim 1, wherein the radiation-sensitive material is heated to minimize residual stress prior to being disposed on the flow field layer.

12. The method of claim 1, wherein the diffusion medium layer is bonded to the flow field layer during the formation of the diffusion medium layer.

13. The method of claim 1, wherein the mask is positioned a distance from the radiation-sensitive material when the radiation-sensitive material is exposed to the plurality of radiation beams.

14. The method of claim 1, wherein the flow field layer is formed on a substrate.

15. The method of claim 14, wherein the substrate is a metal foil and the flow field layer includes a plurality of radiation-cured reactant flow channels.

16. The method of claim 15, wherein the plurality of radiation-cured reactant flow channels include an adhesion promoter that enhances a bonding of the radiation-cured reactant flow channels to the metal foil.

17. The method of claim 1, further comprising the steps of coating at least one of the diffusion medium layer and the flow field layer with an electrically conductive coating.

18. A method for fabricating a fuel cell component, comprising the steps of:
providing a mask having a plurality of radiation transparent apertures, the plurality of radiation transparent apertures permitting a plurality of radiation beams to be directed therethrough;
applying a sacrificial release layer to the mask, the release layer being substantially transparent to the plurality of radiation beams;
applying a radiation-sensitive material to the release layer, the radiation-sensitive material having a sensitivity to the plurality of radiation beams;
providing a substrate having a flow field layer disposed thereon, the flow field layer having a plurality of radiation-cured reactant flow channels;
disposing the radiation-sensitive material on the flow field layer of the fuel cell component;
exposing the radiation-sensitive material to the plurality of radiation beams through the radiation transparent apertures in the mask to form a diffusion medium layer with a micro-truss structure; and
removing the mask and the release layer from the diffusion medium layer.

19. A method for fabricating a fuel cell component, comprising the steps of:
providing a mask having a plurality of radiation transparent apertures, the plurality of radiation transparent apertures permitting a plurality of radiation beams to be directed therethrough;
providing a radiation-sensitive material having a sensitivity to the plurality of radiation beams;
providing a diffusion medium layer with a micro-truss structure;
disposing the radiation-sensitive material on the diffusion medium layer;
exposing the radiation-sensitive material to the plurality of radiation beams through the radiation transparent apertures in the mask to form a flow field layer;
forming a first channel wall in the flow field layer, the first channel wall defined by a self-propagating polymer wall waveguide; and
forming a plurality of spaced apart support ligaments between the first channel wall and one of the diffusion medium layer and a substrate, the ligaments defined by a plurality of self-propagating polymer ligament waveguides.

* * * * *